United States Patent
Bennett

[11] Patent Number: 6,136,253
[45] Date of Patent: Oct. 24, 2000

[54] METHOD FOR MOLDING DUCKBILL VALVE

[75] Inventor: Robert Alfread Bennett, Easton, Conn.

[73] Assignee: Chesebrough-Pond's USA, division of Conopco, Inc., Greenwich, Conn.

[21] Appl. No.: 09/263,026

[22] Filed: Mar. 5, 1999

Related U.S. Application Data

[60] Division of application No. 09/081,328, May 19, 1998, which is a continuation-in-part of application No. 09/000,557, Dec. 30, 1997, abandoned, which is a continuation-in-part of application No. 08/892,594, Jul. 15, 1997, abandoned.

[51] Int. Cl.$^7$ .................................................. B29C 45/26
[52] U.S. Cl. ................................... 264/328.1; 137/846
[58] Field of Search ........................... 264/328.1, 328.12; 425/577; 137/846

[56] References Cited

U.S. PATENT DOCUMENTS

| | | |
|---|---|---|
| 3,159,176 | 12/1964 | Russell et al. . |
| 3,349,972 | 10/1967 | Whiteford . |
| 3,517,682 | 6/1970 | Smith . |
| 3,822,720 | 7/1974 | Souza . |
| 3,967,645 | 7/1976 | Gregory . |
| 4,340,023 | 7/1982 | Creager . |
| 4,458,711 | 7/1984 | Flider . |
| 4,535,818 | 8/1985 | Duncan et al. . |
| 4,660,747 | 4/1987 | Borg et al. . |
| 5,010,925 | 4/1991 | Atkinson et al. . |
| 5,234,138 | 8/1993 | De Laforcade . |
| 5,398,853 | 3/1995 | Latham . |
| 5,431,290 | 7/1995 | Vinciguerra . |

OTHER PUBLICATIONS

Vernay, Vernay Laboratories Inc, Product Brouchure, May 1979.
Vernay Product Brochure—May 1997.

*Primary Examiner*—Jill L. Heitbrink
*Attorney, Agent, or Firm*—Milton L. Honig

[57] ABSTRACT

A duckbill valve is provided which includes a hollow cylindrical elastomeric body with first and second ends. The first end has walls parabolically tapering to an elongate slit, the slit being surrounded by an upper and lower lip. The second end has a non-uniformly round (e.g. oval) outer wall terminating in an open mouth. When inserted into a perfectly round apertured fitting, the non-uniformly round outer walled elastomeric body is bowed to form-fit the round configuration thereby forcing shut the lips and slit. Upon increased air pressure within the elastomeric body, the slit is forced open. In a second embodiment, the inner wall of the second end may be non-uniformly (e.g. oval) round. Insertion of a round tubular fitting within the non-round inner wall of the elastomeric body also achieves a bowed form-fit configuration which forces shut the lips and slit.

7 Claims, 2 Drawing Sheets

METHOD FOR MOLDING DUCKBILL VALVE

This is a divisional of Ser. No. 09/081,328 filed May 19, 1998, which is a continuation-in-part of Ser. No. 09/000,557 filed Dec. 30, 1997 now abandoned, which is a continuation-in-part of Ser. No. 08/892,594 filed Jul. 15, 1997 now abandoned.

BACKGROUND OF THE INVENTION

1. Field of the Invention

The invention concerns a new duckbill valve of improved performance and lower manufacture cost than traditional ones.

2. The Related Art

Duckbill valves are utilized to regulate pressure in a host of devices spanning many industries. Applications for these devices are found in automotive brakes, small home appliances, kidney dialysis, hypodermic syringes, sporting goods, toys, non-aerosol pumps and a variety of industrial equipment. Their popularity stems from their simple construction. No moving parts are present other than the rubber housing itself.

Despite their simplicity, antiquated manufacturing processes have rendered the traditional duckbill valve relatively expensive. Standard manufacture employs compression molding of a rubber followed by a second separate step of cutting a slit into the molded rubber valve. This two step procedure slows production and adds cost.

U.S. Pat. No. 5,010,925 (Atkinson et al.) assigned to Vernay Laboratories, Inc. discloses a more sophisticated version of a duckbill valve assembly. In one embodiment (FIG. 6), an outer wall of the valve body is formed in an oval shape. Insertion of the oval body into a circular recess of a valve fitting biases tapered lips 38, 40 together to close the valve assembly. Unfortunately, the V-shaped tapered walls intersect only at a relatively narrow contact point. This results in a less than robust seal.

Accordingly, it is an object of the present invention to provide a duckbill valve having a stronger seal.

Another object of the present invention is to provide an improved duckbill valve manufacturable in a single process step.

Yet another object of the present invention is to provide a duckbill valve of less expensive construction.

Still another object of the present invention is to provide a duckbill valve having improved longevity and performance.

SUMMARY OF THE INVENTION

A duckbill valve is provided which includes a hollow cylindrical elastomeric body with first and second ends, the first end having parabolic outer walls tapering to an elongate slit, the second end having an outer and inner wall terminating in an open mouth, at least one of the outer and inner walls of the second end being non-uniformly round.

Preferably the non-uniformly round outer and/or inner walls are oval in shape.

The elastomeric body includes a cylindrical mid-section between the first and second ends. A collar surrounds the mouth and projects radially outwardly from outer walls of the second end.

In another aspect of the invention, the elongate slit in the open position (as originally molded) is ovaloid in shape somewhat resembling a football. An upper and lower lip surround the ovaloid slit, each lip having a surface orthogonal to a longitudinal axis traversing the duckbill from the first to second ends. Upper and lower lips in the open position converge to pointed elongate left and right lip ends. Advantageously, the lips extend substantially across the full diameter of the first end. By the term "substantially" is meant at least 70%, preferably at least 85%, but optimally at least 95% across the diameter of the first end. The parabolic curvature of the slit and lip arrangement allow the lips when biased together to engage a relatively large mutual contact surface. A tighter seal is thereby achieved.

Materials of construction for the elastomeric body may be an elastomer prepared from the polymerization of a monomer selected from the group consisting essentially of ethylene, propylene, styrene, butadiene, acrylonitrile and mixtures of these (providing copolymers). Silicones may also be used as a material of construction. Most preferred is the use of Kraton® rubber. The elastomeric body may be transparent.

Duckbill valves of the present invention are formed in a method which includes injecting an elastomer in fluid state into a mold. The mold should contain surface structures that allow formation of an open slit within the elastomeric body. Subsequent to injection, the molded body is ejected from the mold of the injection molding machine.

A key advantage of the present invention is that through injection molding duckbill valve bodies can be manufactured with a slit concurrently constructed with other parts of the device. No longer necessary is a second step of slit cutting. Also of advantage is that less material is needed to form the valve body. The new valve permits thinner walls and indeed even requires less wall material to function. By contrast, prior art duckbill valves must use thick or poorly pliable rubber walls to obtain rigidity. Without rigidity, the old duckbills cannot maintain a closed slit. Rigid rubber cannot be injection molded; it is shaped by compression molding.

Duckbill valves of the present invention according to a first embodiment wherein the outer wall is non-uniformly round (e.g. oval) are intended to be inserted into a fitting having a round interior wall against which is positioned the outer walls of the elastomeric body mid-section. Interaction between the round fitting and non-round wall forces the latter into a round shape thereby compressing together the lips of the slit. Under this arrangement, the slit remains shut so long as atmospheric pressure within the valve and outside the slit are essentially identical. Any significant pressure increase within the hollow cylindrical elastomeric body will cause the slit to part its lips and open allowing for equalization of pressure between inner and outer parts of the valve.

A second embodiment of this invention is a duckbill valve having a round outer wall but a non-uniformly round (e.g. oval) inner wall. Here a duckbill valve assembly is achieved by inserting a rounded outer wall fitting into the non-uniformly round (e.g. oval) inner walled hollow cylindrical elastomeric body. Interaction between the round fitting and non-uniformly round inner wall of the duckbill valve forces the latter into a round shape thereby compressing together the lips of the slit. As in the first embodiment, the slit remains shut so long as atmospheric pressure within the valve and outside the slit are essentially identical. Any significant pressure increase within the hollow cylindrical elastomeric body will cause the slit to part its lips and open allowing for equalization of pressure between inner and outer parts of the valve.

BRIEF DESCRIPTION OF THE DRAWINGS

The various objects, features and advantages of the present invention will more fully be explained by reference to the following drawing in which.

DETAILED DESCRIPTION

Figure 1:
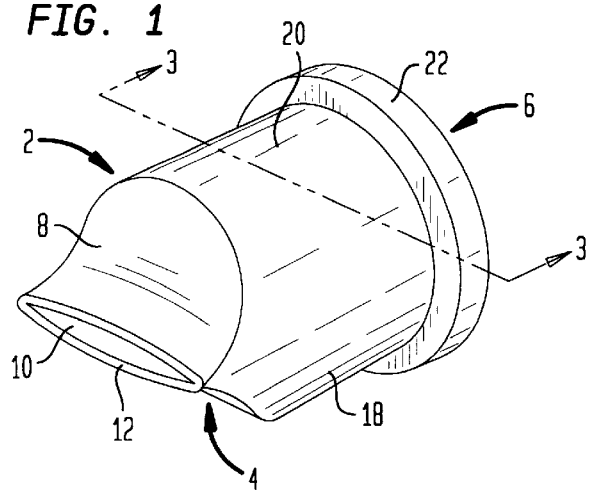
FIG. 1 is a perspective view of a duckbill valve in the open position according to a first embodiment of the present invention.

FIG. 1 illustrates a first embodiment of the duckbill valve of the present invention. The valve includes a hollow cylindrical elastomeric body 2 with first end 4 and second end 6. Parabolically tapered walls 8 are located near the first end converging toward an elongated slit 10 defined by lips 12. The second end of the elastomeric body has an oval shaped outer wall 16 terminating in an open mouth 14 defined by a non-circular inner wall 15. A cylindrical midsection 18 connects the first and second ends. A collar 22 is positioned near the second end and projects radially outwardly from outer walls 20 of the mid-section.

Figure 2:
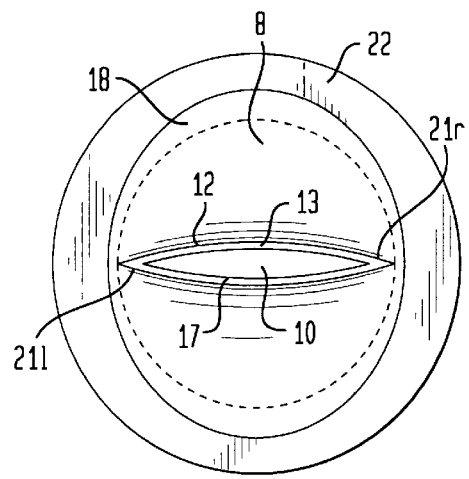
FIG. 2 is a front elevational view of the duckbill valve according to FIG. 1.

FIG. 2 best illustrates the lips 12 which are formed with an upper lip 13 and a lower lip 17. Upper and lower lips in the open (originally molded) position are ovaloid shaped intersecting at left and right slit ends 21*l*, 21*r*.

Figure 3:
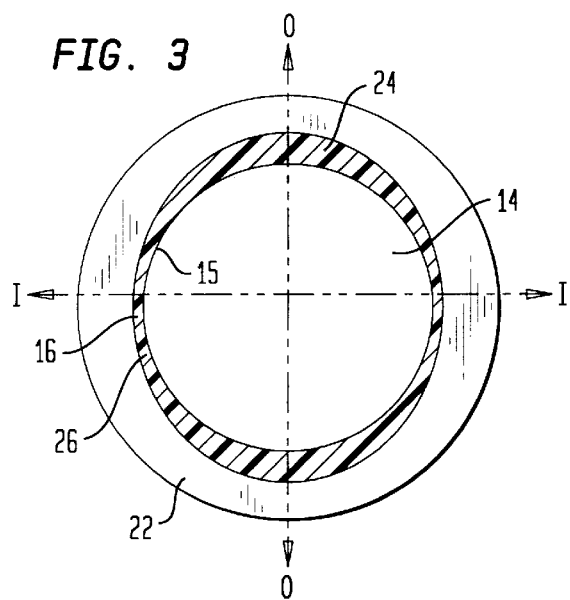
FIG. 3 is a cross-sectional view taken along line 3—3 of FIG. 1.

FIG. 3 best illustrates the outer walls of the mid-section as being non-circular in circumference. In cross-section, walls of the mid-section have a pair of thicker segments 24 spaced apart by thinner segments 26. Both inner and outer walls of the mid-section therefore define an oval shape. Major axis O, I of respective outer and inner walls defining oval shapes are orthogonal to one another. In other words, the oval shapes in their long axis are perpendicular. For purposes of this invention, it is optional to have both the inner and outer walls being non-uniformly round.

Figure 4:
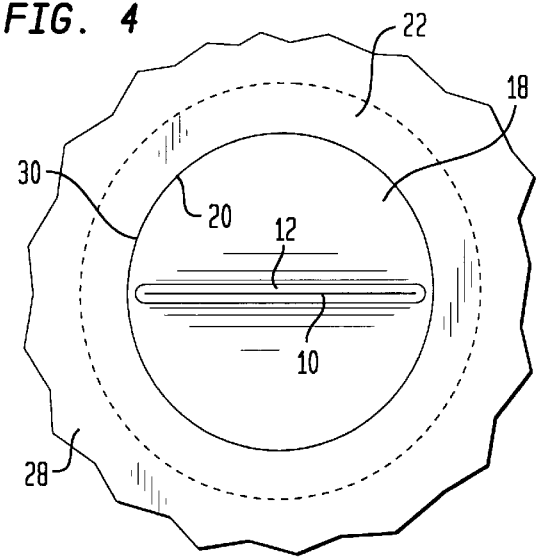
FIG. 4 is a front elevational view of the duckbill valve shown in FIG. 1 inserted within a fitting (seen in partial view) wherein the slit is in a closed position.

FIG. 4 illustrates the duckbill valve having slit 10 compressed into a closed position which results from the elastomeric body being pressed within a tubular fitting 28 to form a valve assembly. The oval geometry of the elastomeric body is forced into a round configuration by the round inner walls 30 of the tubular fitting 28.

Figure 5:
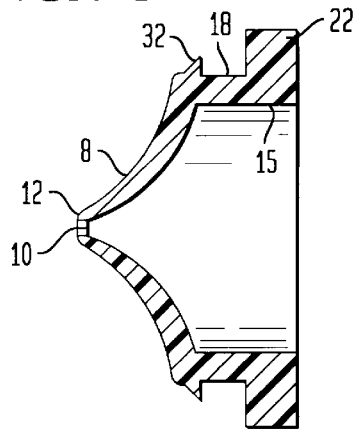
FIG. 5 is a cross-sectional view of a shortened version of FIG. 1 with the slit in an open position.

FIG. 5 illustrates a shortened version of the embodiment of FIG. 1. In this embodiment tapered walls 8 at an end distant from the slit include a securing ridge 32. Mid-section 18 separates ridge 32 from collar 22 and provides a recess for lodging tubular fitting 28.

Figure 6:
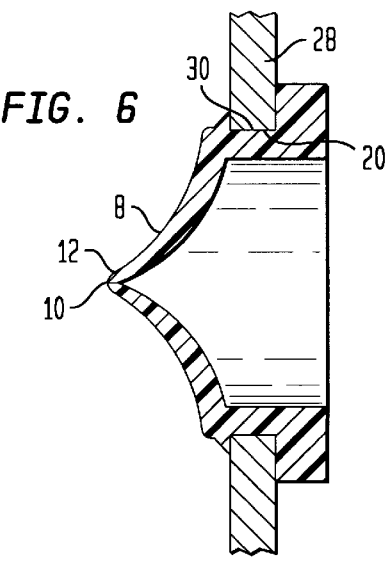
FIG. 6 is a cross-sectional view of the shortened version according to FIG. 5 wherein the duckbill valve has been inserted within a fitting, the slit being in the closed position.

FIG. 6 illustrates the elastomeric body of the duckbill valve inserted within a perfectly round opening of the tubular fitting, the latter bowing the oval walls of the elastomeric body to obtain a seal. As a consequence, slit 10 is forced into a closed position. Opening of the slit occurs only when pressure within the duckbill valve becomes greater than air pressure outside the slit.

Figure 7:
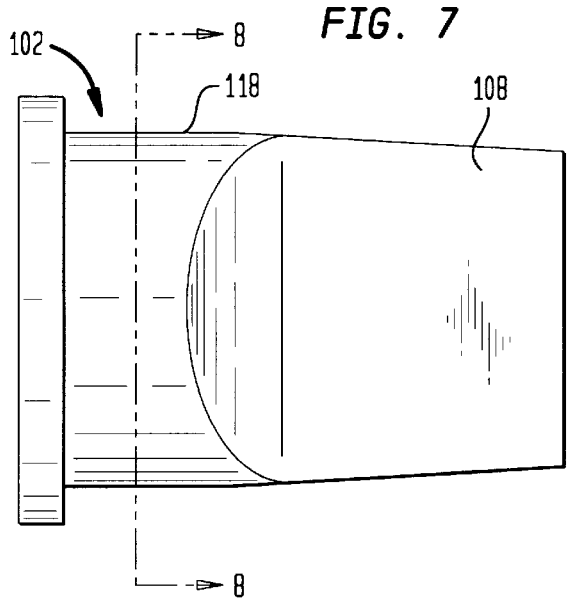
FIG. 7 is a side elevational view of a second embodiment of the duckbill valve according to the present invention.
Figure 8:
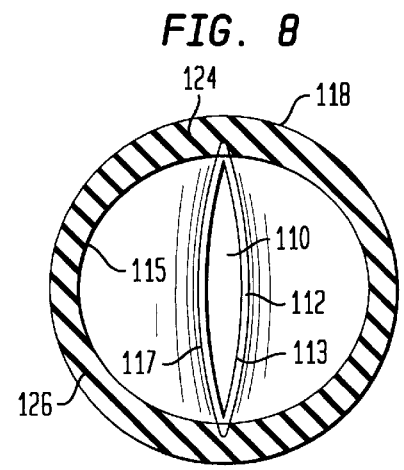
FIG. 8 is a cross-sectional view taken along line 8—8 of FIG. 7.

FIG. 7 illustrates a second embodiment of the present invention. In this embodiment, as best illustrated in FIG. 8 the outer walls of the mid-section are round in circumference while the inner walls are non-circular. In cross-section, walls of the mid-section have a pair of thicker segments 124 spaced apart by 14 thinner segments 126. Thus, the inner wall of the mid-section defines an oval shape. Similar to the first embodiment, the duckbill valve of FIGS. 7 and 8 includes an elongated slit 110 surrounded by lips 112, the latter being formed with an upper and lower lip 113 and 117.

Figure 9:
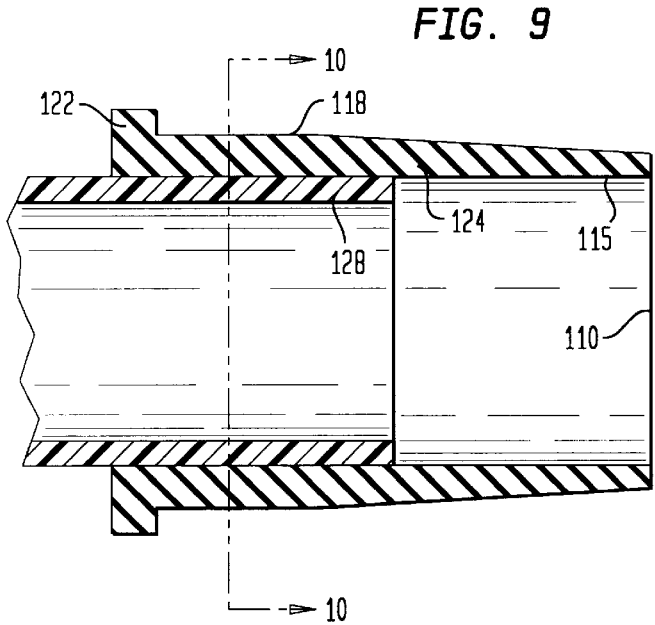
FIG. 9 is a cross-sectional view of FIG. 7 in the longitudinal direction wherein a fitting is inserted within the duckbill valve, the slit being in the closed position.
Figure 10:
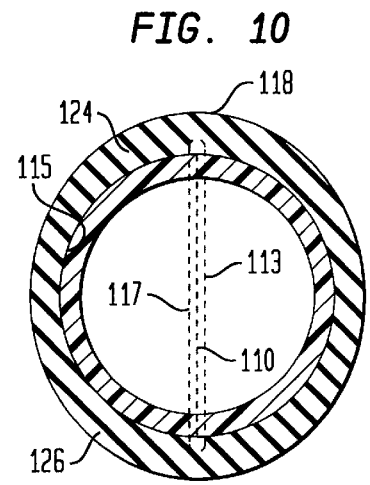
FIG. 10 is a cross-sectional view taken along 10—10 of FIG. 9.

FIG. 9 illustrates the hollow cylindrical elastomeric body 102 of the duckbill valve with non-circular inner wall 115 being seated over a perfectly round tubular fitting 128, the latter bowing the oval inner walls of the elastomeric body 102. As a consequence, slit 110 is forced into a closed position. FIG. 10 illustrates the closed position resulting from the valve assembly combination of the duckbill valve and tubular fitting. Opening of the slit occurs only when pressure within the duckbill valve becomes greater than air pressure outside the slit. The tubular fitting 128 may be a rigid plastic tube such as a diptube in a liquid dispensing container.

Although only two embodiments have been described, those skilled in the art will be able to supply further modifications and adaptations all of which are considered within the purview and scope of the present invention.

What is claimed is:

1. A method for producing a duckbill valve body comprising:

i) injecting an elastomer in a fluid state into a mold, the mold including surfaces allowing formation of an elongate slit in an open position within the body at an end thereof, the surfaces defining a hollow cylindrical body with first and second ends, the first end having parabolic outer walls tapering to the elongate slit, the second end having outer and inner walls terminating in an open mouth, at least one of the outer and inner walls of the second end being non-uniformly round; and ii) ejecting the body from the mold.

2. The method according to claim 1 wherein the tapering results in a concave outer surface of the outer walls of the body and begins at the elongate slit.

3. The method according to claim 1 wherein the non-uniformly round second end is oval in shape.

4. The method according to claim 1 wherein the elongate slit is bounded by an upper lip and a lower lip forming an oval shape in an open position of the valve.

5. The method according to claim 4 wherein the upper and lower lips intersect at opposite lip ends, the slit extending at least 70% across a diameter of the first end.

6. The method according to claim 1 wherein the elastomer is prepared from polymerization of a monomer selected from the group consisting essentially of ethylene, propylene, styrene, butadiene, acrylonitrile and mixtures thereof.

7. The method according to claim 1 wherein the elastomer is a silicone.

* * * * *